(12) United States Patent
Leon et al.

(10) Patent No.: US 7,546,141 B2
(45) Date of Patent: Jun. 9, 2009

(54) HYBRID COMMUNICATION SYSTEM AND METHOD

(76) Inventors: Robert Leon, 3525 SW. 111th Ave., Miami, FL (US) 33165; Jorge L. Olazabal, 8933 SW. 123rd Ct., Miami, FL (US) 33186

( * ) Notice: Subject to any disclaimer, the term of this patent is extended or adjusted under 35 U.S.C. 154(b) by 285 days.

(21) Appl. No.: 11/040,482

(22) Filed: Jan. 21, 2005

(65) Prior Publication Data

US 2005/0197154 A1  Sep. 8, 2005

Related U.S. Application Data (63) Continuation-in-part of application No. 10/719,949, filed on Nov. 21, 2003, which is a continuation-in-part of application No. 09/577,812, filed on May 23, 2000, now Pat. No. 6,680,923.

(51) Int. Cl.
*H04M 1/00* (2006.01)
*H04B 7/00* (2006.01)

(52) U.S. Cl. .................. 455/552.1; 455/41.2

(58) Field of Classification Search .............. 455/556.2, 455/552.1; 375/216; 370/310, 465
See application file for complete search history.

(56) References Cited

U.S. PATENT DOCUMENTS

| | | | |
|---|---|---|---|
| 4,317,233 A | 2/1982 | Kunde et al. | |
| 4,385,295 A | 5/1983 | Willard et al. | |
| 4,412,217 A | 10/1983 | Willard et al. | |
| 4,456,793 A | 6/1984 | Baker et al. | |
| 4,613,856 A | 9/1986 | Mori | |
| 4,613,859 A | 9/1986 | Mori | |
| 4,644,347 A | 2/1987 | Lucas et al. | |
| 4,644,351 A | 2/1987 | Zabarsky et al. | |
| 4,682,148 A | 7/1987 | Ichikawa et al. | |
| D298,230 S | 10/1988 | Lay | |
| 4,779,091 A | 10/1988 | Oyagi et al. | |
| 4,812,813 A | 3/1989 | Ide et al. | |
| 4,823,123 A | 4/1989 | Siwiak | |
| 4,825,193 A | 4/1989 | Siwiak et al. | |
| 4,851,829 A | 7/1989 | DeLuca et al. | |

(Continued)

FOREIGN PATENT DOCUMENTS

CL    1982-1998    3/1999

(Continued)

*Primary Examiner*—Charles N Appiah
*Assistant Examiner*—Kiet Doan
(74) *Attorney, Agent, or Firm*—Malloy & Malloy, P.A.

(57) ABSTRACT

A system and method for establishing hybrid communications which establishes said communication with any one of a variety of different wireless communication devices enabled to receive satellite data transmissions such as satellite radio either directly via an over the air network or through the provision of a short range transceiver assembly so as to provide data communication from to the wireless communication device from a computer network, such as the Internet or a LAN connected to the Internet, utilizing a computer network access. The wireless communication device is structured to seamlessly auto switch its operation between either of at least two independent frequencies for communication with the computer network or with the over-the-air network, dependent on predetermined parameters including the acceptance of a unique identifier or code and/or the positioning of the wireless communication device within a predetermined vicinity range relative to the network access.

18 Claims, 3 Drawing Sheets

U.S. PATENT DOCUMENTS

| | | | |
|---|---|---|---|
| 4,855,731 A | 8/1989 | Yoshizawa et al. |
| 4,856,047 A | 8/1989 | Saunders |
| 4,876,537 A | 10/1989 | Oyamada |
| 4,891,637 A | 1/1990 | Siwiak et al. |
| 4,910,794 A | 3/1990 | Mahany |
| 4,940,963 A | 7/1990 | Gutman et al. |
| 4,940,975 A | 7/1990 | Ide et al. |
| 4,975,694 A | 12/1990 | McLaughlin et al. |
| 5,032,835 A | 7/1991 | DeLuca |
| 5,070,536 A | 12/1991 | Mahany et al. |
| 5,093,659 A | 3/1992 | Yamada |
| 5,131,038 A | 7/1992 | Puhl et al. |
| 5,136,480 A | 8/1992 | Pristash et al. |
| 5,189,358 A | 2/1993 | Tomura et al. |
| 5,239,249 A | 8/1993 | Flanders et al. |
| 5,239,294 A | 8/1993 | Flanders et al. |
| 5,289,178 A | 2/1994 | Schwendeman |
| 5,291,192 A | 3/1994 | Ichikawa et al. |
| 5,296,849 A | 3/1994 | Ide |
| D348,775 S | 7/1994 | Scheid |
| 5,349,696 A | 9/1994 | Matai |
| 5,363,089 A | 11/1994 | Goldenberg |
| 5,363,377 A | 11/1994 | Sharpe |
| 5,452,829 A | 9/1995 | King et al. |
| 5,459,773 A | 10/1995 | Hwang |
| 5,465,086 A | 11/1995 | Gleeson et al. |
| 5,465,290 A | 11/1995 | Hampton et al. |
| 5,479,486 A | 12/1995 | Saji |
| 5,483,676 A | 1/1996 | Mahany et al. |
| 5,488,759 A | 2/1996 | Lim et al. |
| D368,582 S | 4/1996 | King et al. |
| D371,556 S | 7/1996 | Khoo |
| D371,557 S | 7/1996 | Hon et al. |
| 5,537,678 A | 7/1996 | King et al. |
| 5,546,463 A | 8/1996 | Caputo et al. |
| 5,546,471 A | 8/1996 | Merjanian |
| 5,565,859 A | 10/1996 | Matsumoto |
| D377,019 S | 12/1996 | Nagato et al. |
| D377,266 S | 1/1997 | Khoo et al. |
| 5,596,318 A | 1/1997 | Mitchel |
| 5,613,019 A | 3/1997 | Altman et al. |
| 5,657,345 A | 8/1997 | Lazardis |
| D385,530 S | 10/1997 | Hames et al. |
| D388,059 S | 12/1997 | Halstead et al. |
| 5,701,258 A | 12/1997 | Harris et al. |
| 5,705,995 A | 1/1998 | Laflin et al. |
| D390,353 S | 2/1998 | Ross et al. |
| D390,699 S | 2/1998 | Goldenberg et al. |
| 5,778,024 A * | 7/1998 | McDonough ............... 375/216 |
| 5,791,912 A | 8/1998 | Riechelmann et al. |
| D398,608 S | 9/1998 | Nguyen et al. |
| D399,821 S | 10/1998 | Tyneski et al. |
| 5,819,184 A | 10/1998 | Cashman |
| 5,844,772 A | 12/1998 | Lee et al. |
| 5,844,773 A | 12/1998 | Malhi |
| 5,847,336 A | 12/1998 | Thornton |
| 5,872,834 A | 2/1999 | Teitebaum |
| 5,875,401 A | 2/1999 | Rochkind |
| 5,910,946 A | 6/1999 | Csapo |
| 5,940,015 A | 8/1999 | Thornton et al. |
| 5,940,751 A | 8/1999 | Kaplan et al. |
| 5,943,692 A | 8/1999 | Marberg et al. |
| 5,949,775 A | 9/1999 | Rautiola et al. |
| 5,971,557 A | 10/1999 | Kubes et al. |
| 5,974,312 A | 10/1999 | Hayes, Jr. et al. |
| 5,975,711 A | 11/1999 | Parker et al. |
| 5,987,440 A | 11/1999 | O'Neil et al. |
| 5,987,480 A | 11/1999 | Donohue et al. |
| 5,987,498 A | 11/1999 | Athink et al. |
| 6,006,205 A | 12/1999 | Loeb et al. |
| 6,018,724 A | 1/2000 | Arent |
| 6,023,241 A | 2/2000 | Clapper |
| 6,023,682 A | 2/2000 | Checchio |
| 6,028,764 A | 2/2000 | Richardson et al. |
| 6,038,661 A | 3/2000 | Yoshioka et al. |
| 6,040,784 A | 3/2000 | Miller |
| 6,047,047 A | 4/2000 | Aldridge et al. |
| 6,049,291 A | 4/2000 | Kikinis |
| 6,052,812 A | 4/2000 | Chen et al. |
| 6,073,124 A | 6/2000 | Krishnan et al. |
| 6,167,258 A | 12/2000 | Schmidt et al. |
| 6,198,941 B1 * | 3/2001 | Aho et al. ................. 455/552.1 |
| 6,202,060 B1 | 3/2001 | Tran |
| 6,272,348 B1 | 8/2001 | Saario et al. |
| 6,282,433 B1 * | 8/2001 | Holshouser ............... 455/556.2 |
| 6,400,961 B1 * | 6/2002 | Lillie et al. ............... 455/552.1 |
| 6,549,543 B1 | 4/2003 | Shin |
| 6,570,871 B1 | 5/2003 | Schneir |
| 6,601,040 B1 | 7/2003 | Kolls |
| 6,608,832 B2 | 8/2003 | Foslow |
| 6,680,923 B1 | 1/2004 | Leon |
| 2003/0039242 A1 | 2/2003 | Moore, Jr. |
| 2003/0067894 A1 | 4/2003 | Schmidt |

FOREIGN PATENT DOCUMENTS

| | | |
|---|---|---|
| CL | 1819-1998 | 6/1999 |
| CL | 1722-1999 | 3/2000 |
| CL | 3469-2000 | 11/2001 |
| CL | 2816-2002 | 10/2003 |
| CN | 1335701 A | 2/2002 |
| EP | 0 766 427 A2 | 4/1997 |
| EP | 1 089 578 A2 | 4/2001 |
| EP | 1 533 943 A1 | 5/2005 |
| HK | 1075766 | 12/2005 |
| JP | 2005-159605 | 6/2005 |
| JP | 200518603 | 6/2005 |
| NG | 15733 | 11/2004 |
| SE | 529 170 | 5/2007 |
| WO | WO 01/90853 A2 | 11/2001 |
| WO | WO 02/07379 A2 | 1/2002 |
| WO | WO 03/039009 A2 | 5/2003 |

* cited by examiner

HYBRID COMMUNICATION SYSTEM AND METHOD

CLAIM OF PRIORITY

The present application is a continuation-in-part application of previously filed, now pending application having Ser. No. 10/719,949, filed Nov. 21, 2003, which is a continuation-in-part of Ser. No. 09/577,812 U.S. Pat. No. 6,680,923, issued Jan. 20, 2004 and filed, May 23, 2000, the contents of both of which are hereby incorporated by reference.

BACKGROUND OF THE INVENTION

1. Field of the Invention

This invention is directed to a system and method of establishing wireless data transmission using a wireless communication device, such as a cellular telephone, either over a computer network, such as the Internet, through an network access facility, or alternatively by a compatible over the air network, such as a satellite data transmission network, such as those that may be used to communicate satellite radio, dependent on whether the wireless communication device and the network access are relatively located inside or outside a pre-established vicinity range. The system includes auto-switching capabilities for determining the route of communication with the wireless communication device dependent, at least in part, on predetermined parameters, which may include the pre-established vicinity range and recognition of a unique identifier associated with at least the wireless communication device.

2. Description of the Related Art

At the present time, it is well recognized that the wireless communication industry is enjoying a period of dramatic growth. Although the number of subscribers is still relatively low, as compared to the maximum capacity available, carriers are offering networks with excellent coverage, lower prices and an increasing variety of additional options and features. As such, there is a recognized limit to the traditional wireless communications capabilities. As such, even with the recent advancements in wireless communication technology there exists even more opportunity to provide subscribers with vastly improved wireless communication standards and/or functionality.

Additionally, it is recognized that with the increasing popularity of local or global computerized networks, individuals are relying more and more heavily on alternate means of communication and information gathering. Still, however, each of these communications mediums, despite there usefulness, are maintained generally independent from one another, requiring a user to utilize the specified technological medium applicable. Moreover, as the technologies are maintained generally independent from one another, they do not take full advantage of integration possibilities available due to advances in technology. For example, one increasingly popular medium for wireless communication relates to the use of "Bluetooth" technology. Such technology allows short range, wireless communication between devices, thereby providing more versatility and eliminating many cabling limitations/requirements that may limit expansion. Still, however, despite the advantageous nature of such wireless communications protocols, the use of such technology is currently limited to traditional communicative links, replacing a more traditional connectivity solution. As such, the art has failed to truly explore the cross-over potentials available through the expansion of such technology.

Further, it is also recognized that a technological advances in the field of handheld device are extending constantly to new frontiers and new technologies, one such technology relating to the reception of satellite data transmissions. One such example relates to Satellite Radio whereby subscribers, utilizing a specially adapted receiver which enables paid access, are able to receive data in the form of audio transmissions. Conversely, non-subscribers, whose receiving device is not appropriately recognized and/or encoded are not able to effectively receive and/or decode these satellite data transmissions. Although the technology associated with a satellite receiver is becoming increasingly advanced, however, one significant drawback that remains relates to signal clarity. For example, if an antenna associated with the satellite receiver is in an outdoor, unobstructed location, clear reception is achieved. Whenever the antenna is placed indoors away from a window or in an obstructed location, the signal degrades rapidly and in most instances is not useable. As such, many satellite service providers have begun allowing users to have alternate means of accessing the transmitted data through another device such as a computer connected to the Internet. Accordingly, it would be beneficial to provide a device and/or system which would allow a user to maintain only one device for receipt of subscriber transmissions in the most efficient and cost effective manner possible, thereby significantly reducing the instances when service is not available without requiring alternate devices and/or a computer with an Internet connection.

Accordingly there is a substantial need in the art for a system and method which enables the integration or cross-over of various generally related technologies so as to substantially increase the versatility and productivity of the communications and/or data transmission services offered. Specifically, as will be described within the context of the present invention and has yet been un-addressed in the art, such improved technology could include a hybrid communication or receiver system which will operate using, for example, flex paging protocol in combination with Bluetooth or similar technology for short range messaging. Such an improved hybrid system should have the ability to automatically switch to messaging communication with the wireless communication device using, for example, an Internet access facility, such as a personal computer (PC), when two transceivers incorporating the Bluetooth or equivalent technology are within the pre-established vicinity range, without requiring the cost and/or bandwidth limitations of direct, long range wireless internet access. Alternatively, such an improved system as provided by the present invention could automatically switch to over-the-air network messaging or satellite data transmission network communication with the wireless communication device, when outside the pre-established vicinity range, representing substantial savings for both the carriers and the users. In particular, carriers could save money by freeing up limited band width and thereby have the capacity to subscribe more users, while not having to upgrade current infrastructure hardware. Users on the other hand could save money because they would have the ability to send and receive large messages and e-mail wirelessly, when within the aforementioned pre-established vicinity range, at a cost no more than the cost of their current network connection, plus current one-way messaging service.

SUMMARY OF THE INVENTION

This invention is directed to a system and method of hybrid communication which provides data communication including, but not limited to, voice, video and/or alphanumeric messaging, either over a computerized network, such as the Internet, using an appropriate access facility, such as a personal computer, or alternatively by means of an over-the-air network such as, but not limited to, a cellular/paging network, satellite communication and other applicable types of communication networks which may either transmit data, receive data or both transmit and receive data. The wireless communication device, as set forth above, may include a pager, cellular telephone, personal digital assistant (PDA), satellite radio receiver or other applicable wireless communication devices structured and designed to perform data communication.

The system and method of the present invention incorporates a transceiver assembly operative on a recognized spread spectrum standard capable of short range communication such as "Bluetooth technology". As is recognized in the communication field, Bluetooth technology incorporates 2.4 GHz wireless data solution utilizing spread spectrum techniques as set forth in detail above. However, as utilized hereinafter the term "transceiver assembly" refers to any type of short range technology operable in the fashion of "Bluetooth technology" but not limited thereto.

More specifically, the hybrid communication system and method of the present invention comprises the utilization of one or more wireless communication devices, of the type set forth above, each having a transceiver connected thereto and operable on a short range radio frequency (RF), wherein each of the plurality of wireless communication devices include a unique identifier or code capable of being recognized by another compatible transceiver, which may also define a part of the aforementioned transceiver assembly. More specifically, a first transceiver designed to function in accordance with Bluetooth or equivalent technology, is connected to a computerized network access, such as an Internet access facility including but not limited to, a computer facility or PC. A second transceiver is connected to the wireless communication device. The system and method of the present invention contemplates the provision of a plurality of computerized network accesses and a plurality of wireless communication devices, wherein, for purposes of clarity, each of the aforementioned plurality of computers may be connected to a first transceiver and each of the aforementioned plurality of wireless communication devices may be connected with a second transceiver. The unique identifiers associated with each of the plurality of wireless communication devices are preferably, but not necessarily, unique onto themselves and serve as an identifying code to any one of the appropriately programmed or configured first transceivers associated with different ones of the plurality of computers. Recognition and the establishment of messaging communication may be dependent, at least in part, on at least one predetermined parameter. One such predetermined parameter may be a vicinity range, wherein the first and second transceivers, in order to recognize one another must be within a pre-established vicinity. Currently such a pre-established vicinity range may be generally about 100 meters. However, it is emphasized that the vicinity range is not limited to 100 meters and can vary greatly based at least in part on technological advancements and the specific applications of the present invention. Another possible predetermined parameter may be the unique identifier itself, wherein communication between any one of the plurality of computerized network accesses must identify and accept the unique identifier or code of the wireless communication device as well as be within the predetermined vicinity range. As set forth above, the vicinity range may be pre-established and determined based on current technological standards and may vary greatly.

The communication system and method of the present invention also incorporates auto-switching capabilities, wherein data communication is automatically established with the network access when at least one, or both of the aforementioned predetermined parameters (vicinity range and identification) have been established and wherein a first transceiver associated with the computerized network access and the second transceiver associated with the wireless communication device are configured to recognize and accept one another to establish such communication. Alternatively, the auto-switching capabilities of the present invention establishes data communication by means of a compatible over-the-air network, such as an appropriate paging/cellular network, satellite communication, etc. when the predetermined parameters between a given access facility and a corresponding wireless communication device are not met. More particularly and also by way of example only, the wireless communication device, when in the acceptable vicinity range of a computer, wherein both incorporate a first and second transceiver as set forth above, can perform data communication over the computerized network, including directly or ultimately the Internet, by means of the computer or other access facility. However, when the wireless communication device is disposed beyond the established vicinity range, the auto-switching capabilities will automatically provide for data communication with the wireless communication device by means of the over-the-air network, as set forth above, if available. The wireless communication device associated with the system and method of the present invention is therefore capable of being operative over at least two distinct frequency ranges, dependent on data communication being established with the computer network or a compatible over-the-air network, such as a paging/cellular infrastructure or satellite data transmission network.

Other features of the system and method of the present invention comprise the transceiver assembly, whether incorporating Bluetooth technology or its equivalent, including a scanning capability wherein scanning for recognition, preferably of the unique identifier associated with each of the transceivers is conducted and when the aforementioned predetermined parameters, including for example an acceptable vicinity range of 100 meters or other pre-established distance, is met, mutual recognition of the first and second transceivers is accomplished. Such scanning may therefore be referred to as a "find-me-follow-me" procedure which may occur on a substantially continuous basis.

In addition to the above, the communication system and method of the present invention also may include configuration capabilities. This allows messages which would be normally communicated by means of the over-the-air network to be "stored" until communication with a particular one of the plurality of wireless communication devices is established with an appropriate computer incorporating the transceiver assembly technology of the type set forth above. Then, communication is established between the computer and the particular wireless communication device to which the messages were originally sent. Alternatively, the configuration capabilities may allow the selective configuring of the system, such that any stored messages would be transmitted only during a pre-selected time window. Such configuring of course may assume a variety of other data regulating configurations.

As yet another example of the predetermined parameters may include cost and/or signal strength. For example, in some environments it may be less expensive to a user to communicate using the computer network rather than an over the air network, and visa versa. As such, the predetermined parameters allow designation of which manner of communication would be most beneficial to a user. As for the issue of signal strength, it is recognized that in some instances, such as in the case of a satellite communication network such as satellite radio, it may be preferable to use the over the air network whenever possible, however, signal strength can often vary or be reduced, such as in an indoor or remote environment, which could lead to the auto-switching capability switching to communication over the computer network.

One advantage of the hybrid communication system and method of the present invention which may serve as an incentive is the concept of "revenue sharing". More specifically, the system provides the capability of the owner of a computer to decide which wireless communication devices may have access to the network, utilizing his or her computer, assuming that both the computer and any one of the plurality of wireless communication devices are associated with the same piconet of the Bluetooth or equivalent transceiver assembly technology. The system may include security software allowing only wireless devices with "permission" to be able to access the computer's network. As the incentive to open access to others, including strangers, revenue sharing would involve the service provider system giving credit, in the form of money or other incentives, to the owner of the computer which allows access to "stranger" wireless communication devices.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
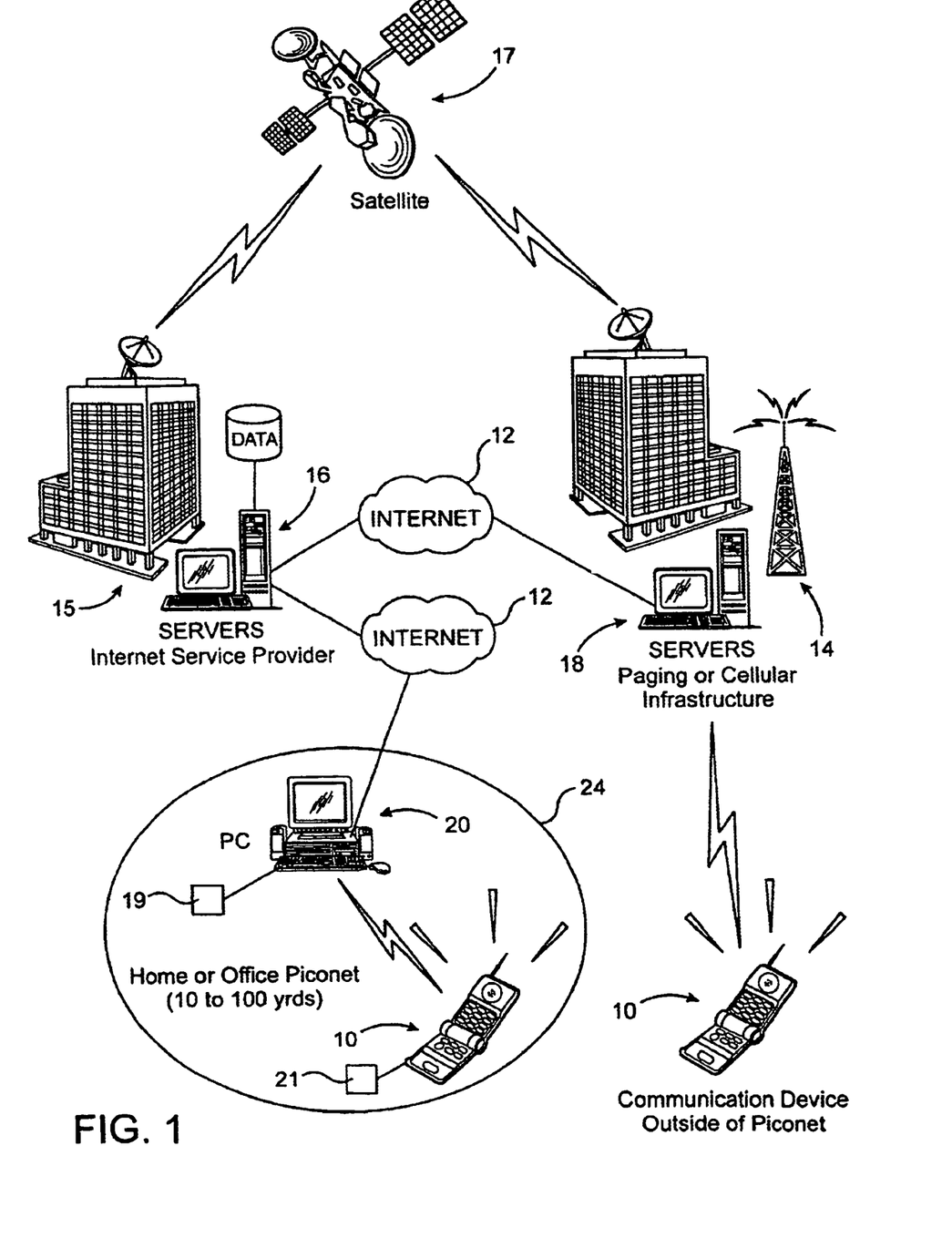
FIG. 1 is a schematic representation of one embodiment of the hybrid communication system and method of the present invention.

The present invention relates to a system and method of hybrid communication wherein communication is established with any one of a plurality of wireless communication devices, generally indicated as 10 in FIG. 1. Such wireless communication devices may of course include a pager assembly, cellular telephone, PDA, satellite radio or video receiver, etc. More importantly, messaging communication can be established with any of the plurality of wireless communication devices 10 either by means of a global or local computerized network, such as for example, the Internet 12 through an Internet service provider 15 including one or more servers 16, or alternatively by a compatible over-the-air network, such as that generally indicated as 14 in the embodiment of FIG. 1, also possibly including appropriate servers 18. The over-the-air network can be defined by any compatible paging and/or cellular infrastructure, satellite communication 17, such as a satellite data transmission network which may be used, for example, to communicate satellite radio or video programming and/or other satellite data, or other appropriate communication facilities, dependent on the type of wireless communication device 10 being utilized and a variety of other related factors.

In one preferred embodiment of the present invention, a transceiver assembly is utilized to provide possible short range wireless communication. By way of example, this transceiver assembly may be in the form of or incorporate Bluetooth technology. Specifically, Bluetooth technology is a used for short range communication between various devices and is the official name of a specification that has become one of the fastest growing technology standards in recent times. Simply put, Bluetooth is a specification for a global wireless technology standard that allows devices to communicate with each other using a secure radio frequency. As such, the use of a Bluetooth transceiver enables at least short range communication without the burden of cables, but at a high rate of data transmission, without line-of-site requirements, typically necessary for infrared technology. In such an embodiment, the transceiver assembly may include at least one small, low power radio transceiver mounted on a chip that communicates with other Bluetooth-enabled device. Because it operates on radio frequency (RF) Bluetooth eliminates the need for cables and can connect on a one-to-one or on a one-to-many basis. In addition, at least the illustrated Bluetooth transceiver has the enhanced versatility of supporting voice and video data as well as other data communications, thereby allowing it to be extended into hands-free voice communications. In an embodiment wherein the Bluetooth technology is integrated, it may use a 2.4 GHz range, spread spectrum standard radio band, which is un-licensed and available almost worldwide. In addition, the transceiver assembly is preferably capable of transmitting through solid, non-metal objects, enjoying an operative range of generally from 10 cm to 10 m, which is typically extended to a vicinity range of about 100 meters, by increasing the transmitting power, and is omni directional, supporting both isochronous and asynchronous services.

Also in the illustrated embodiment incorporating the Bluetooth technology, such a transceiver assembly enables a connection and communication wirelessly via short-range, ad hoc networks and can normally support up to eight peripheral devices in a "piconet", which may be defined as two or more Bluetooth or equivalent technology units sharing a common channel. Furthermore, the transceiver assembly may be structured to provide synchronous voice channels which allows the assembly to reserve bandwidth for carrying digital voice data. As such, the system can support three or more simultaneous, full duplex voice conversations within a given piconet.

Also in this embodiment wherein a Bluetooth or similar transceiver is utilized, authentication and encryption is preferably provided in its baseband protocol. For example, the authentication may rely on a challenge/response protocol utilizing a unique identifier (password, PIN, etc.). Two devices communicating with one another within the appropriate or pre-established vicinity range must contain or have recognition of the same unique identifier. This protocol allows each device to authenticate the other, automatically. After the devices are authenticated it is possible to encrypt transmission for added security. It is noted, however, that as to the unique identifier, it may or may not be unique to a specific wireless communication device. For example, multiple communication devices may include the same unique identifier indicating they will have access to the computerized network, however, it is generally preferred that the unique identifier be unique to a specific wireless communication device such that continuous and/or conforming data communication can be maintained when auto-switching is achieved, as will be described.

Additionally, it is noted that the Bluetooth and equivalent transceiver assembly technology integrated into the present invention may be designed to carry voice, data and video information at approximately, but not limited to, 760 Kbps. While this speed of data transmission is not favorably compared to present day wire speed, it is equal to or substantially better than the speed achieved by current digital subscriber lines (DSL) or cable modem services. At this speed, the transceiver assembly can handle video or full stereo sound, and can supply high resolution images at a somewhat lower frame rate while simultaneously carrying voice and data streams.

Of course, despite the preceding, it is emphasized that the system and method of the present invention utilizes the term "transceiver assembly", which in the context of the present invention, is meant to include the aforementioned Bluetooth technology or any other existing or to be developed transceiver technology utilizing an applicable frequency and/or short range communication standard which may or may not have all of the functional characteristics of Bluetooth and/or may have more functional characteristics. As such, the system and method of communication of the present invention is not meant to be limited to Bluetooth technology, and the subsequent specific description utilization and explanation of certain characteristics previously recited as being characteristic of a Bluetooth transceiver are not intended to be limited to such technology.

Accordingly, the transceiver assembly of the present invention comprises at least one transceiver, preferably in the form of a transceiver chip operative on radio frequencies (RF), wherein such a first transceiver 19 is connected to one or a plurality of network accesses or network access assemblies, such as a PC or like computer facility such as a gateway router and/or wireless access point, generally indicated as 20 that provides access to a computerized network. The transceiver assembly of the system and method of the present invention may also include at least a second transceiver also in the form of an integral and/or connectable radio chip connected to or incorporated within each of the plurality of wireless communication devices 10. For example, the second transceiver may be an add on article, such as which may be connected via any of a plurality of potential interfaces that may be provided on the wireless communication device, such as a memory or sim card slot. Each of the wireless communication devices 10 may also include a unique identifier or "code" to facilitate recognition between the first and second transceiver chips 19 and 21. As explained in greater detail hereinafter, the unique identifier may define one of a plurality of predetermined parameters, more specifically referred to as an identification parameter, utilized to establish messaging communication with appropriate ones of a plurality of wireless communication devices 10. When recognized each of the wireless communication devices 10 becomes part of a piconet, generally indicated as 24, which may exist in a home, office, or any other area incorporating one or more Internet access facilities or computers 20. The piconet 24 may be defined by the operative features of the aforementioned transceiver assembly. At least one other predetermined parameter which may be established, based at least in part on the short range frequency standard on which the transceiver assembly operates, is a pre-established vicinity range. More specifically, the pre-established vicinity range may be currently defined as about 100 meters. However, it is emphasized that the actual vicinity range incorporated in the present invention may vary greatly and is not limited to the indicated 100 meters. The pre-established vicinity range therefore allows data communication, over the computerized network, such as the Internet 12, with the wireless communication device 10, by means of the computerized network access 20, provided that the first transceiver 19 associated with the computer 20 and the second transceiver 21 associated with the wireless communication device 10, are compatible or configured to recognize one another. In order to accomplish this identification parameter, the maximum distance between the wireless communication device 10 and the computer 20 must be within the pre-established vicinity range, which of course may vary, as described above. Furthermore, as a plurality of computerized network access may be in proximity to one another and all providing access to the computerized network, the second transceiver may be effectively configured to communicate with whichever first transceiver provides optimal signal at a given moment. Moreover, as to the unique identifier, all or part thereof may be common to all or a plurality of wireless communication devices so as to provide for effective communication between the first and second transceivers, although it may be preferred that at least some portion of the unique identifier be unique to each specific wireless communication device for a variety of reasons, including billing and transmission continuity when switching occurs between network access and/or to/from an over the air network as will be described.

Each of the plurality of wireless communication devices are preferably multi-line, to the extent that they are capable of operating on at least two, but possibly more, distinct frequencies. Accordingly, once the communication device 10 wanders outside of the pre-established vicinity range of the piconet 24 an auto-switching capability associated with the system and method of the present invention preferably, but not necessarily, automatically establishes communication between the wireless communication device 10 and the over-the-air network 14. As set forth above, the over-the-air network may be defined by appropriate cellular/pager infrastructure, including server 18 or other communication networks such as, but not limited to, satellite communication 17 and others.

The communication system and method of the present invention preferably also incorporates scanner capabilities, which is more specifically incorporated within the aforementioned transceiver assembly. Operative features of the scanner capabilities of the present invention provide for preferably continuous scanning, wherein the first and second transceivers 19 and 21 are continuously searching to establish messaging communication between compatibly configured network accesses 20 and wireless communication devices 10. The scanning capabilities are completed when, for example, one of the plurality of wireless communication devices 10 wanders within the pre-established vicinity range of the piconet 24 and includes a unique identifier or code which is recognizable by the first transceiver 19 associated with the computer 20. Upon recognition and when all the pre-determined parameters have been met, messaging communication between the computer 20 and the one or more wireless communication devices 10 is established. The communication system and method of the present invention also includes selective configuration capabilities which allows a user to configure his account to regulate data transmission to a particular wireless communication device. Such selective configuration can be accomplished via a particular communication device 10 or alternatively through the website of the Internet service provider 15 and/or the individual servers 16, at least when an Internet type computerized network is utilized.

Figure 3:
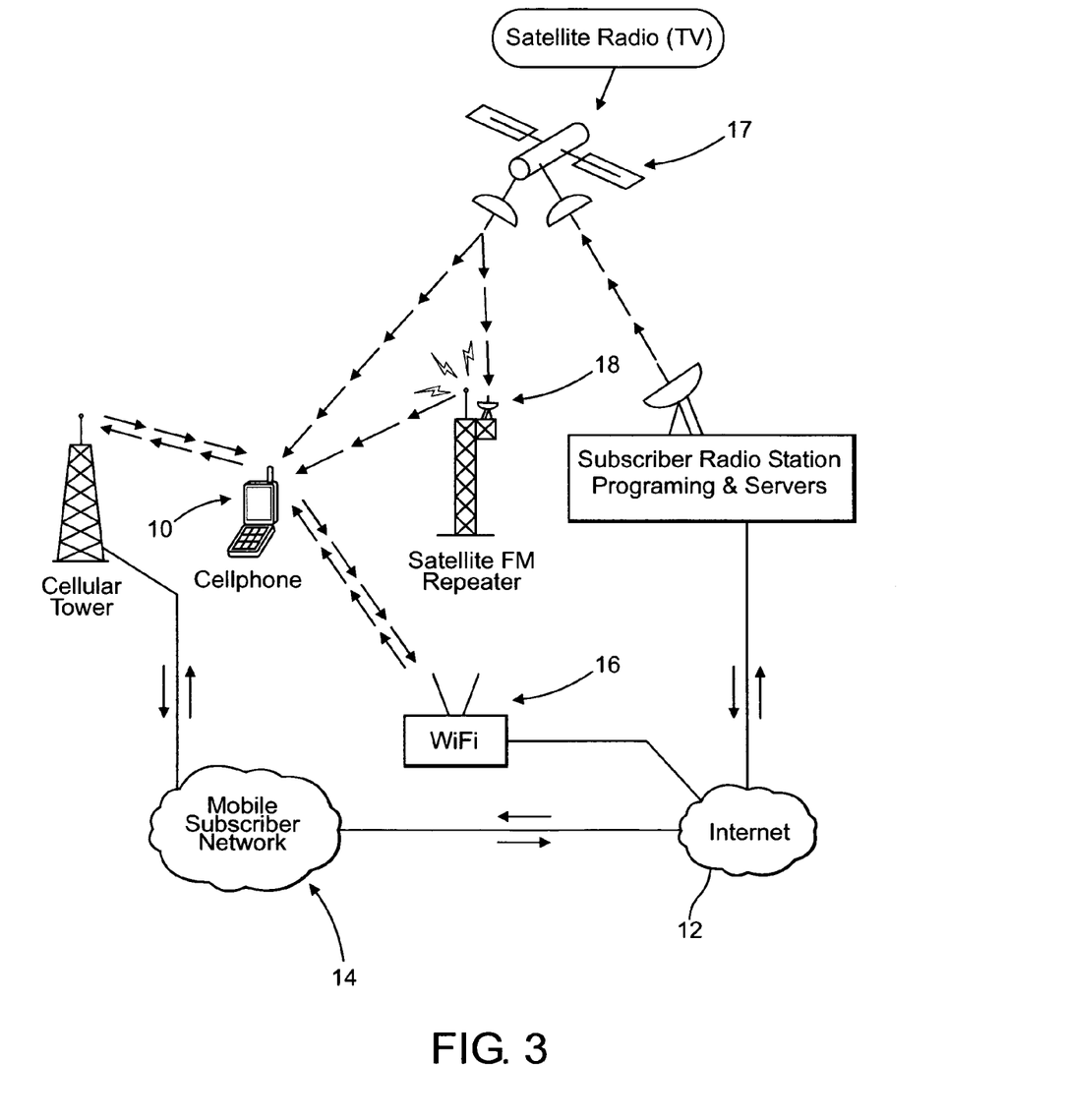
FIG. 3 is a schematic representation of elements of alternative embodiments of the hybrid communication system and method of the present invention including varying types of functionality in the context of satellite data transmissions.

Looking in further detail to an embodiment, as in FIG. 3, whereby the over the air network includes at least a satellite data transmission network 17, the wireless communication device will include at least satellite signal receiver. As can be appreciated, in any embodiment, the wireless communication device necessarily includes at least one transceiver and/or receiver allowing appropriate communication with the over the air network with which it was designed to operate. Therefore, in the case of a wireless communication device in the form of a satellite media receiver, an appropriate wired or wireless connection to a satellite signal receiver, which generally includes an antenna, capable of receiving and conveying satellite data to a user, typically though decoding of the satellite data and providing audio and/or video to the user through corresponding audio and/or video components integrated and/or connected to the wireless communication device. Of course, in the preferred illustrated device, the wireless communication device is multi-functional such that in addition to being capable of receiving satellite data, is also capable of consummating communication over an alternate over the air network, such as a standard or satellite cellular telephone network. Therefore, in such an embodiment, as well as in other embodiments with alternate primary and/or secondary functionality, the satellite receiver may be integrally formed and/or may be an add on component connected to the wireless communication device by any of a plurality of interfaces, such as a sim or memory card interface. Nevertheless, the aforementioned auto-switching capability is incorporated with the satellite receiver and the transceiver assembly, and in the case of a multi function device, may also be independently incorporated between the transceiver assembly and the additional over the air network transceiver or receiver, such as the normal cellular network transceiver.

With further regard to the pre-determined parameter(s) that result in the auto switching, although a primary parameter may be the described proximity factor between the first and second transceivers of the transceiver assembly, additional or alternate parameters may be defined. For example, monetary considerations, such as which mode of communication is more cost effective to a user when both are available, or signal strength, such as when the auto switching results in a switch from a satellite data transmission network to a computer network, as may be the case with a satellite radio and/or video embodiment, may define the main auto switching parameter or one of two or more parameters that must be present. In terms of signal strength as a parameter, as can be appreciated, if a clear and/or minimally obstructed view to the sky from which the satellite data transmissions are being directed is not present, signal degradation and/or loss can result. Accordingly, the auto switching capability may be configured to maintain the connection that provides the best signal to the user. Under such a circumstance, the satellite data provider preferably provides it's auxiliary source data via the computer network, and using, for example, the unique identifier, which can in some instances be variable so as to designate which data stream was being received by a user, auxiliary source data that corresponds the satellite data is communicated to the wireless communication device via the computer network so that continuous and preferably uninterrupted transmission of the satellite data is maintained. Of course, these same factors apply to any type of communication over any type of over the air network. Also, as a further back up, in some instances, an over the air network may use an alternate over the air broadcast of fits signal, such as an FM transmission using an FM repeater 18, as a back up. In such a situation, the wireless communication device also preferably includes a receiver capable of receiving data from that alternate or back up over the air network, the auto switching capability being between the primary over the air network, such as the satellite data transmission network, the back up over the air network, such as the FM transmitter, and the computer network.

Figure 2:
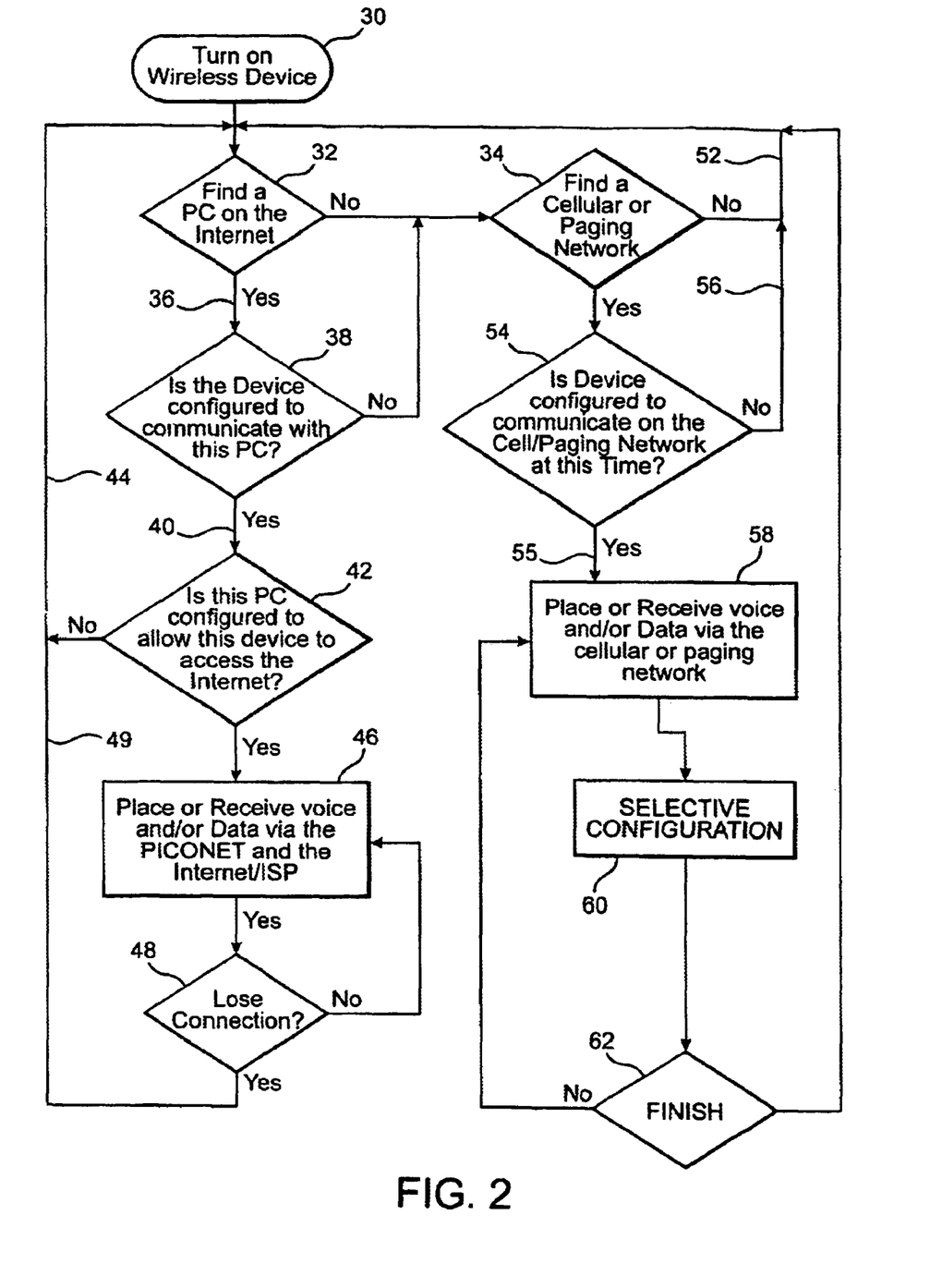
FIG. 2 is a schematic representation in flow chart form of certain operative steps which are representative of and at least partially define the system and method of the present invention.

Turning to FIG. 2, and by way of example only, a method of operation and utilization of the communication system of the present invention is illustrated. More specifically, in operation any one of the plurality of wireless communication devices 10 is activated as at 30 and, through operation of the continuous scanning capabilities, as set forth above, a first and second transceiver 19 and 21, associated with the transceiver assembly of the present invention, provide for a "find-me-follow-me" procedure in an attempt to recognize one another and establish messaging communication, as at 32. If the aforementioned pre-determine parameters of identification and vicinity range are not met the auto-switching capabilities of the present invention are automatically operative to find an appropriate, compatible over-the-air network such, as a cellular/paging, satellite or other appropriate network, as at 34. However, assuming that the wireless communication device 10 locates a network access, such as an Internet access facility or computer, as at 36, it is next determined, through operative features of the transceiver assembly and combined features of the scanning assembly, whether the computer 20 is configured to recognize and communicate with the wireless communication device 10, as indicated as 38. The configuring of both the computer 20 and the wireless communication device 10 is accomplished by the appropriate programming of the first and second transceivers 19 and 21 defining the aforementioned transceiver assembly. Next, assuming compatible configuration between the computer 20 and the wireless communication device 10 as indicated at 40, it is determined whether the computer 20 is configured to allow the particular wireless communication device 10 to access the Internet 12 as at 42. If the computer 20 is not so configured, then the scan capability is operative to continue searching for a computer which is compatible to the extent of allowing data communication to be established with the particular wireless communication device. However, if no computer can be located, the auto-switching capability is again operative to transfer data communication to an appropriate or compatible over-the-air network 14, as at 44. However, if computer 20 is configured to access the computerized network 12, data communication is thereby established as at 46, wherein voice, video, alphanumeric or other data may be sent or received by virtue of the piconet 24, over the computerized network 12, utilizing the network service provider 15. Naturally, the auxiliary source data corresponds the data being communicated via the over the air network so as to maintain transmission continuity and define a "seamless" transition from one communication pathway to another. Thereafter, if the connection is lost as at 48, the auto-switching capability returns to the scanning capabilities as at 49, 44 to continuously search for a compatible Internet access facility or computer 20 or alternatively switches to communication with an over-the-air network, as at 34.

Alternatively, and as explained above, if a predetermined parameter of establishing data communication within the piconet 24, between computer 20 and the wireless communication device 10, is not established, such as by the wireless communication 10 being located outside the pre-established vicinity range, a search is made for a compatible over-the-air network 14, such as, but not limited to a cellular, or paging network infrastructure and/or server 18 or other appropriate over-the-air network, such as satellite communication. If one is not found, as at 52, the auto-switching capabilities, as well as the continuous scanning facility, are re-activated, as at 32 and the procedure begins again. Alternatively, assuming that the wireless communication devices are properly configured to establish communication by means of the over-the-air network 14, the decision as at 54 is made whether current data communication may be established. If not, as at 56, the auto-switching and scanning capabilities of the system are re-activated as set forth above. Assuming that current communication is allowed as at 55 data communication may be conducted, as at 58.

The system and method of the present invention may further comprise selective configuration capabilities, as generally set forth above and as indicated as 60 in FIG. 2. This means that the receipt of data by means of the over-the-air network 14 or the computerized network 12, through the computer 20 may be pre-configured by the user. More specifically, the user may configure a particular account so as to regulate data communication with the particular wireless communication device 10, in terms of how and when such data may be received on either the computer 20 or the over-the-air network 14. By way of example only, the user 10 may selectively configure the account, utilizing either a particular wireless communication device 10 or alternatively the website of the Internet service provider 15, to establish communication, utilizing the transceiver assembly to only accomplish compatible recognition between specific computers 20 and certain wireless communication devices 10. Alternatively, the user can control or regulate what type of data and/or at what time certain communications can be sent by the over-the-air network 14 or over the Internet 12.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A hybrid communication system for wireless data transmission and reception said system comprising:
   a) a wireless communication device including a unique identifier and capable of conducting data communication through an over-the-air network,
   b) said wireless communication device including at least a satellite signal receiver structured to receive satellite data from a satellite data transmission network as said over the air network, and communicate said satellite data to a user,
   c) a computerized network,
   d) a transceiver assembly operative on a short range communication standard and structured to interconnect said wireless communication device with a network access to establish data communication therewith,
   e) said transceiver assembly and said satellite signal receiver including an auto-switching capability responsive to a pre-determined parameter at least partially defined by a pre-established vicinity range,
   f) said auto-switching capability being at least determinative of data communication with said wireless communication device either over the computerized network through said network access or by said satellite data transmission network dependent on the establishment of said wireless communication device being within said pre-established vicinity range,
   g) said data communication with said wireless communication device over the computerized network at least including auxiliary source data corresponding to said satellite data;
   h) said transceiver assembly comprising a first transceiver connected to said computerized network access and a second transceiver connected to said wireless communication device;
   i) said transceiver assembly including selective configuration capabilities responsive to said first and second transceivers being located within said pre-established vicinity range; said system structured to instruct said over the air network to regulate transmission of data to said wireless communication device;
   j) said transceiver assembly including a scanning capability, said scanning capability structured to provide continuous searching by at least one of said first or second transceivers for the other of said transceivers and establish communication there between when said wireless communication device is within said pre-established vicinity range.

2. A hybrid communication system as recited in claim 1 wherein said wireless device further includes an cellular network transceiver structured to establish said data communication through a corresponding over-the-air network, said transceiver assembly and said cellular network transceiver include an auto switching capability responsive to a predetermined parameter.

3. A hybrid communication system as recited in claim 2 wherein said auto-switching capability of said transceiver assembly and said cellular network transceiver is further structured to be determinative of data communication with said wireless device either over the computerized network through said computer network access or by said cellular network.

4. A hybrid communication system as recited in claim 3 wherein said auto-switching capability of said transceiver assembly and said cellular network transceiver is independent of said auto-switching capability of said transceiver assembly and said satellite receiver.

5. A hybrid communication system as recited in claim 1 wherein said wireless communication device further includes an FM receiver structured to receive and communicate to the user data being broadcast from an FM transmitter.

6. A hybrid communication system as recited in claim 5 wherein said data being broadcast from said FM transmitter, which said FM receiver is structured to receive, comprises auxiliary source data corresponding to said satellite data and said auto-switching capability is further structured to be determinative of data communication with said wireless communication device of said satellite data or said corresponding auxiliary source data either over the computerized network through said computer network access, by said satellite data transmission network, or by said FM transmitter, dependent on the establishment of said predetermined parameter.

7. A hybrid communication system as recited in claim 1 wherein said predetermined parameter further comprises cost.

8. A hybrid communication system as recited in claim 1 wherein said predetermined parameter further comprises signal strength.

9. A hybrid communication system as recited in claim 1 wherein said transceiver assembly automatically establishes communicative recognition between said computer network access and said wireless communication device within said pre-established vicinity range.

10. A hybrid communication system as recited in claim 1 wherein said predetermined parameter further comprises recognition compliance of said wireless communication device based at least partially on said unique identifier.

11. A hybrid communication system as recited in claim 1 wherein said predetermined parameters further comprise a decrease of signal integrity from said satellite data transmission network while said computer network access and said wireless communication device are within said pre-established vicinity range.

12. A system as recited in claim 1 wherein said over-the-air network is responsive to selective storage of all data to said wireless communication device and/or transmit data to said wireless communication device within a selectable time window.

13. A system as recited in claim 12 wherein modification of said selective configuration capability is performed through said wireless communication device.

14. A system as recited in claim 13 wherein modification of said selective configuration capability is performed through said computer network.

15. A hybrid communication system as recited in claim 1 wherein said auto-switching capability is responsive to said pre-established vicinity range to automatically establish at least two way communication between said wireless communication device and said computer network.

16. A hybrid communication system as recited in claim 1 wherein said wireless communication device comprises a pager assembly including multiline communication capabilities operable on at least two independent frequency ranges.

17. A hybrid communication system as recited in claim 1 wherein said wireless communication device comprises a cellular telephone.

18. A hybrid communication system for wireless data transmission and reception said system comprising:
   a) a wireless communication device including a unique identifier and capable of conducting data communication through an over-the-air network,
   b) said wireless communication device including at least a satellite signal receiver structured to receive satellite data from a satellite data transmission network as said over the air network, and communicate said satellite data to a user,
   c) a computerized network,
   d) a transceiver assembly operative on a short range communication standard and structured to interconnect said wireless communication device with a network access to establish data communication therewith,
   e) said transceiver assembly and said satellite signal receiver including an auto-switching capability responsive to a pre-determined parameter at least partially defined by a pre-established vicinity range,
   f) said auto-switching capability being configured to maintain a more prominent signal strength to said wireless communication device and being at least determinative of data communication with said wireless communication device either over the computerized network through said network access or by said satellite data transmission network dependent on the establishment of said pre-established vicinity range,
   g) said data communication with said wireless communication device over the computerized network at least including auxiliary source data corresponding to said satellite data;
   h) said transceiver assembly comprising a first transceiver connected to said computerized network access and a second transceiver connected to said wireless communication device; and
   i) said transceiver assembly including selective configuration capability responsive to said first and second transceivers being located within said pre-established vicinity range; said system structured to instruct said over the air network to regulate transmission of data to said wireless communication device,
   j) said transceiver assembly including a scanning capability, said scanning capability structured to provide continuous searching by at least one of said first and second transceivers for the other of said transceivers and establish communication there between when said wireless communication device is within said pre-established vicinity range.

* * * * *